United States Patent [19]

Stine et al.

[11] Patent Number: 4,944,197

[45] Date of Patent: Jul. 31, 1990

[54] RESILIENT RANGE INTERLOCK

[75] Inventors: Alan C. Stine, Kalamazoo; Joseph D. Reynolds, Climax, both of Mich.

[73] Assignee: Eaton Corporation, Cleveland, Ohio

[21] Appl. No.: 362,786

[22] Filed: Jun. 7, 1989

[51] Int. Cl.[5] .................. F16H 63/36; F16H 63/38; F16H 59/08

[52] U.S. Cl. .................. 74/477; 74/475; 74/476; 74/745

[58] Field of Search .................. 74/475, 476, 477, 745

[56] References Cited

U.S. PATENT DOCUMENTS

2,654,268 10/1953 Perkins .................. 74/745
3,229,551 1/1966 Stuckey .................. 74/745
4,060,005 11/1977 Bost .................. 74/745
4,409,859 10/1983 Yarnell .................. 74/745 X Primary Examiner—Allan D. Herrmann
Attorney, Agent, or Firm—H. D. Gordon

[57] ABSTRACT

A compound transmission (10) comprising a main transmission section (12) connected in series with a range type multiple speed auxiliary section (14) having at least two selectable range type ratios, and a shift control unit (56) therefor, is provided. The shift control includes a resilient range interlock structure (178, 190) for inhibiting main section shifts from neutral during a range shift transient.

9 Claims, 9 Drawing Sheets

A
RESILIENT RANGE INTERLOCK

RELATED APPLICATIONS

This application is related to U.S. Ser. No. 342,507, filed April 24, 1989 and U.S. Ser. No. 311,564, filed Feb. 16, 1989, both assigned to the assignee of this invention.

BACKGROUND OF THE INVENTION

1. Field of the Invention

The present invention relates to a range interlock for a compound range type mechanical transmission which will inhibit shifting of the main transmission section from neutral during a range shift transient, and in particular, to a resilient range interlock for a compound transmission which will resiliently inhibit, but not prohibit, shifting of a compound transmission from neutral during a range shift transient.

2. Description of the Prior Art:

Compound transmission systems comprising manually shifted multi-speed main transmission sections connected in series with one or more multi-speed auxiliary drivetrain sections, usually of the range, splitter or combined range/splitter type are well known in the prior art. The auxiliary sections are usually input and/or output auxiliary transmission sections but may also be multi-speed drive axles, transfer cases or the like. Examples of such compound systems may be seen by reference to U.S. Pat. Nos. 4,754,665; 3,648,546; 3,429,202; 4,455,883; 4,561,325; 4,663,725, 3, 799,002; 4,455,883 and 4,527,446, the disclosures of which are hereby incorporated by reference. These transmissions, are well received and widely utilized in manually shifted heavy duty vehicles.

As is known, in the prior art controls for range type compound transmissions, an interlock is required to retain the main transmission section in neutral during a range auxiliary section shift transient.

These prior art controls are not totally satisfactory as an interlock to inhibit, but not prohibit, shifting of the main transmission section until the selected auxiliary range ratio is fully engaged was not provided.

SUMMARY OF THE INVENTION

In accordance with the present invention, the drawbacks of the prior art are overcome or minimized by the provision of a compound transmission comprising a multiple speed main transmission section connected in series with a multiple speed auxiliary section including at least two-speed range gearing. The shift control for the transmission includes a shift bar housing actuated by a standard shift lever or cross-shaft shift finger and defines two distinct positions for moving the shift bar and shift fork associated with the main section ratio or ratios compounded by the two-speed auxiliary range ratio.

Movement of the shift finger actuated shift bar housing between the two distinct positions associated with movement of the one shift fork is sensed internally of the shift bar housing to actuate devices mounted at the transmission for shifting of the auxiliary two-speed range section. According to the present invention, a resilient interlock is actuated during auxiliary section range ratio shift transients to inhibit, but not prohibit, shifting of the mainsection from neutral until the range shift in the auxiliary section is completed. In alternate embodiments, the range section may be shifted by a control lever or button, usually mounted at or on the shift lever.

In situations requiring that a main section shift occur with the range section not engaged, usually during start from stop or cold downshifts, the resilient interlock may be overcome allowing the main section to be shifted from neutral into a selected ratio.

This and other objects and advantages of the present invention may be appreciated by reference to the attached drawings taken in connection with the description of the preferred embodiment.

DESCRIPTION OF THE PREFERRED EMBODIMENT

Figure 1:
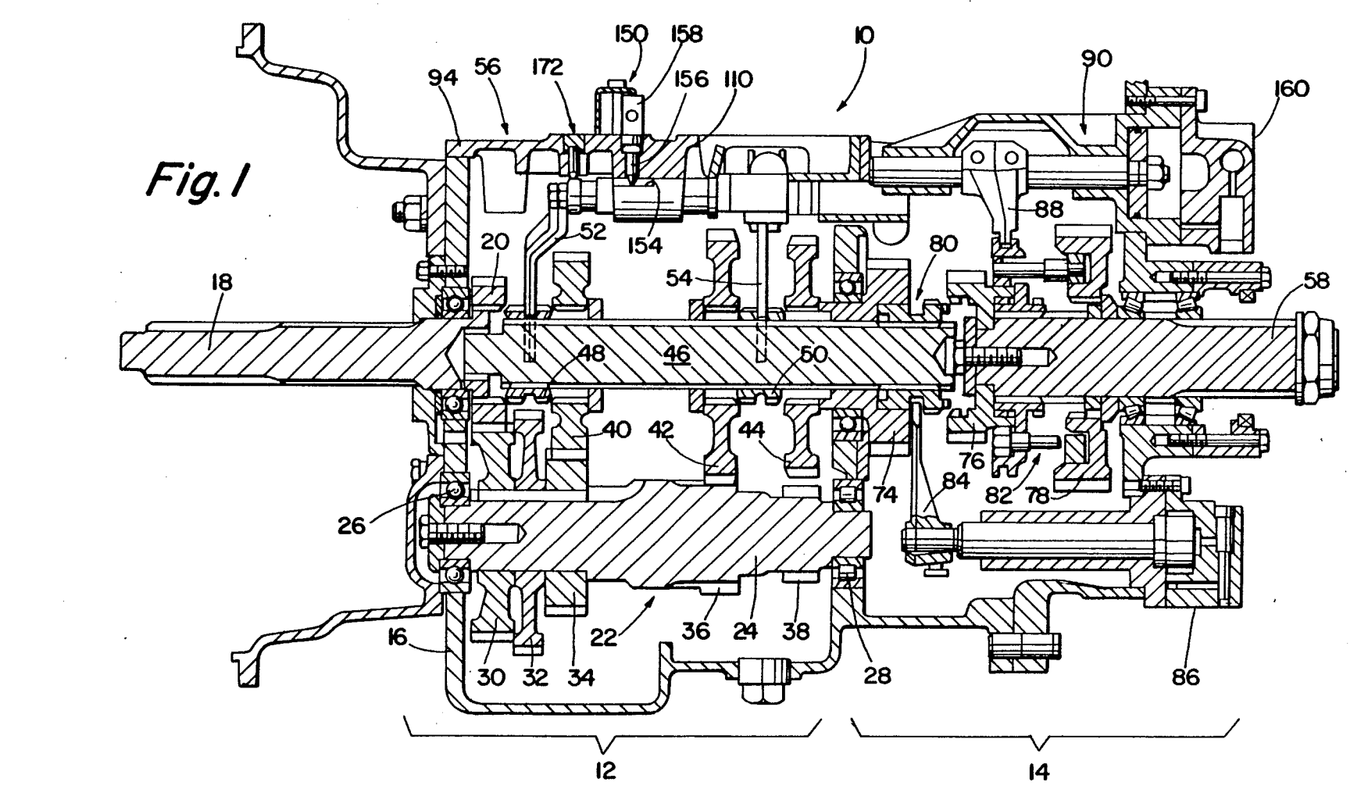
FIG. 1 is a plan view, in section, of a compound transmission utilizing the resilient interlock of the present invention.
Figure 12:
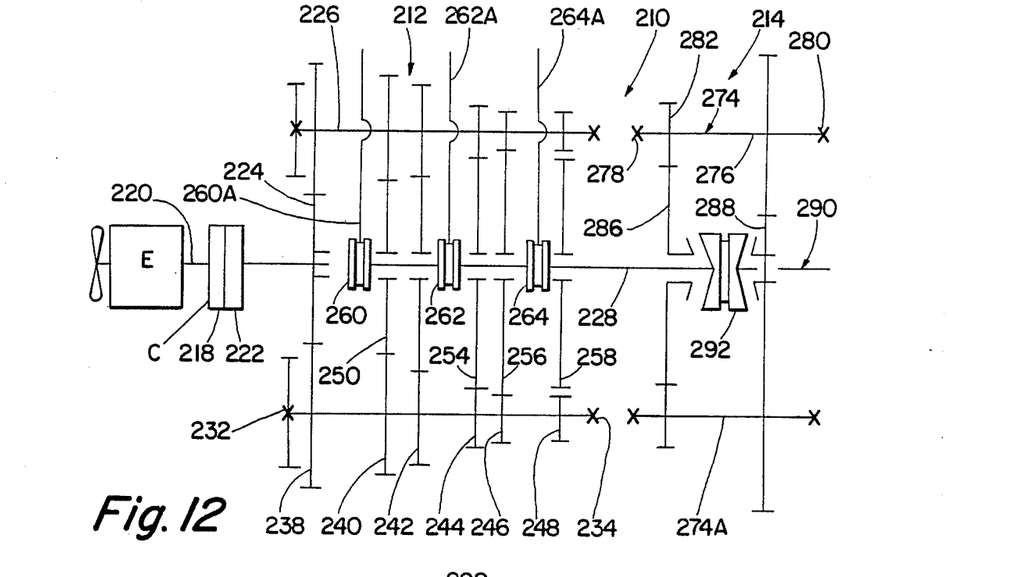
FIGS. 12, 12A and 12B are schematic illustrations of an alternate range type compound transmission utilizing the resilient interlock of the present invention.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectfully to the left and right sides of the transmission as illustrated in FIGS. 1 and 12. The words "inwardly" and "outwardly" will refer to directions toward and away from, respectively, the geometric center of the device and designated parts thereof. Said terminology includes the words above specifically mentioned, derivatives thereof and words of similar import.

The term "compound transmission" is used to designate a change speed or change gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio and the term "downshift" as used herein shall mean the shifting from a higher speed gear ratio to a lower speed gear ratio. The terms "low speed gear" or "low gear" as used herein shall designate a gear utilized for relatively lower forward speed operation in a transmission, i.e., a set of gears having a higher ratio of reduction of output shaft speed relative to the speed of the input shaft.

Figure 1A:
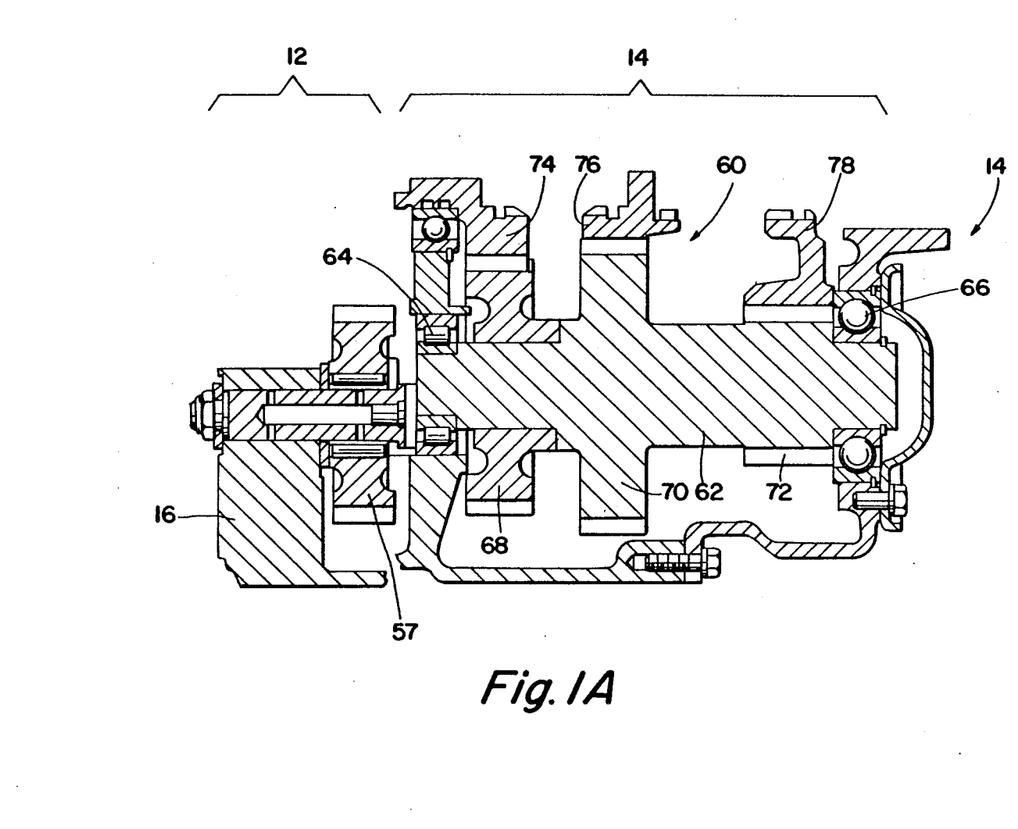
FIG. 1A is a partial view, in section, of the auxiliary section countershaft gearing of the transmission of FIG. 1.
Figure 2:
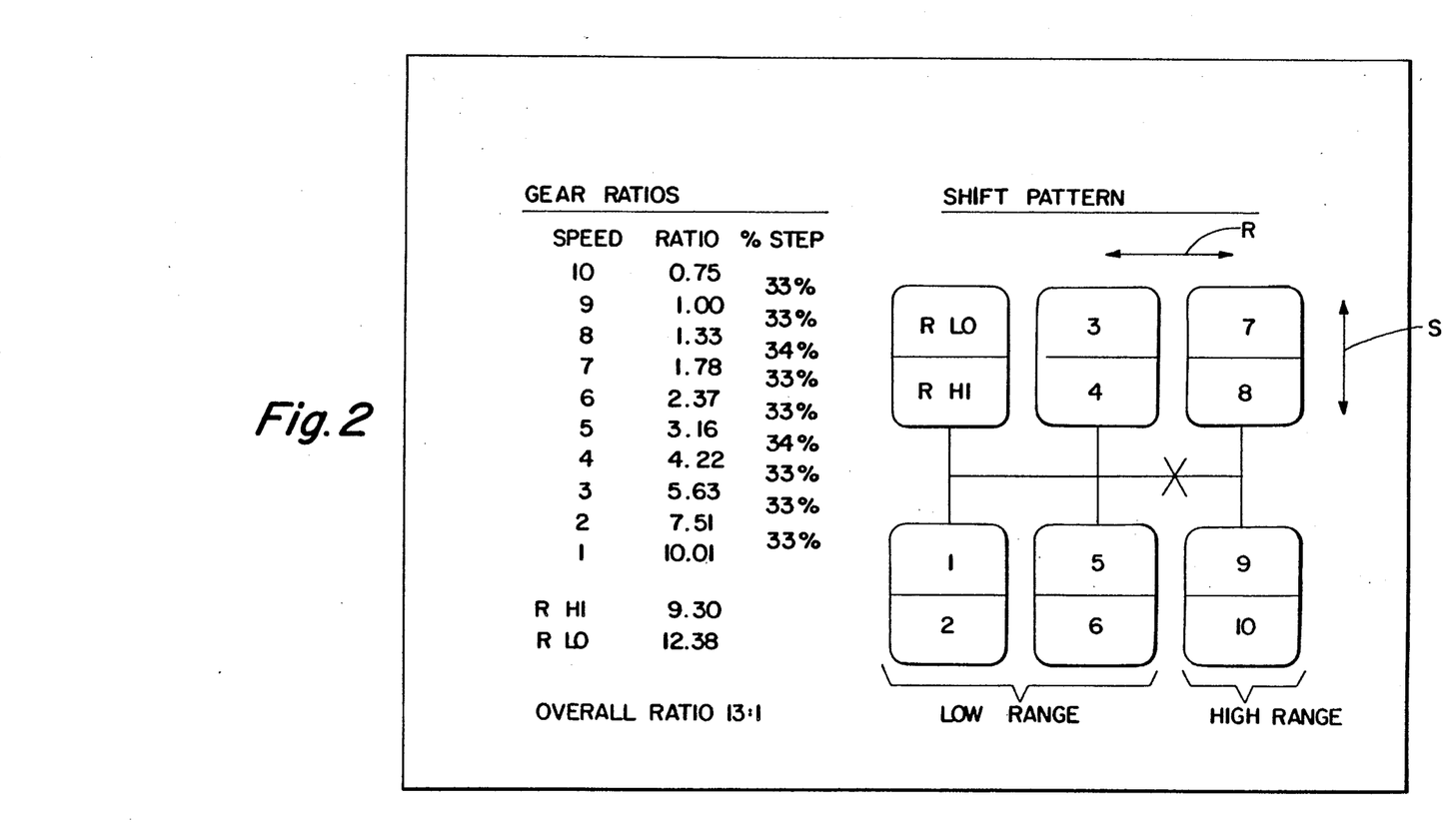
FIG. 2 is a schematic illustration of the shift pattern and typical ratio steps for the transmission of FIG. 1.
Figure 3:
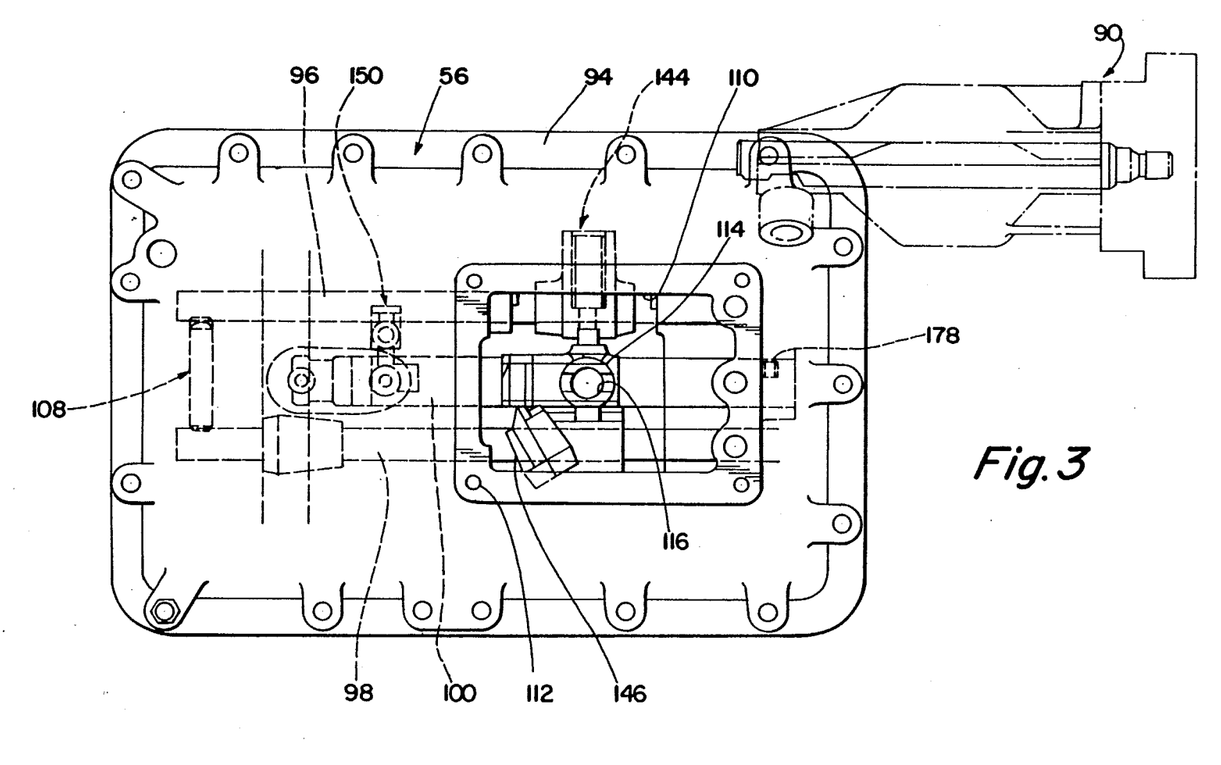
FIG. 3 is a top view of the transmission of the present invention.

Referring now to FIGS. 1-3, the compound transmission 10 is illustrated. Transmission 10 comprises a main transmission section 12 connected in series with an auxiliary transmission section 14 having both range and splitter type gearing. Typically, transmission 10 is housed within a single multi-piece housing 16 and includes an input shaft 18 driven by a prime mover such as a diesel engine (not shown) through a selectively disengaged, normally engaged, friction master clutch (not shown).

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are hereby incorporated by reference, input gear 20 simultaneously drives a plurality of substantially identical mainsection countershaft assemblies at substantially identical rotational speeds. Each of the mainsection countershaft assemblies comprises a mainsection countershaft 24 supported by bearings 26 and 28 in housing 16 and is provided with mainsection countershaft gears 30, 32, 34, 36 and 38 fixed thereto. A plurality of mainsection drive or mainshaft gears 40, 42 and 44 surround the transmission mainshaft 46 and are selectively clutchable, one at a time, to the mainshaft 46 for rotation therewith by sliding clutch collars 48 and 50 as is well known in the art. Clutch collar 48 may also be utilized to clutch input gear 20 to the mainshaft 46 to provide a direct drive relationship between the input shaft 18 and the mainshaft 46. Preferably, each of the mainsection mainshaft gears encircles the mainshaft 46 and is in continuous meshing engagement with and is floatingly supported by the associated countershaft gear groups, which mounting means and special advantages resulting therefrom are explained in greater detail in above-mentioned U.S. Pat. Nos. 3,105,395 and 3,335,616. Typically, clutch collars 48 and 50 are axially positioned by means of shift forks or yokes 52 and 54, respectively, associated with a shift bar housing assembly 56 to be described in greater detail below. Clutch collars 48 and 50 are, in the preferred embodiment, of the well known non-synchronized double acting jaw clutch type.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are three-position clutches in that they may be positioned in a centered axially nondisplaced, nonengaged position as illustrated or in a fully rightwardly engaged or fully leftwardly engaged position.

Auxiliary transmission section 14 is connected in series with main transmission section 12 and is of the three-layer, four speed combined splitter/range type as illustrated in above-mentioned U.S. Pat. No. 4,754,665. Mainshaft 46 extends into the auxiliary section 14 and is journaled in the inward end of the output shaft 58 which extends from the rearward end of the transmission.

Auxiliary transmission section 14 includes, in the preferred embodiment thereof, a plurality of substantially identical auxiliary countershaft assemblies 60 (see FIG. 1A) each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78 which surrounds the output shaft 58. Accordingly, auxiliary section countershaft gears 68 and splitter gear 74 define a first gear layer, auxiliary section countershaft gears 70 and splitter/range gear 76 define a second gear layer and auxiliary section countershaft gears 72 and range gear 78 define a third layer, or gear group, of the combined splitter and range type auxiliary transmission section 14.

A sliding two-position jaw clutch collar 80 is utilized to selectively couple either the splitter gear 74 or the splitter/range gear 76 to the mainshaft 46 while a two-position synchronized clutch assembly 82 utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12 and the function of double-acting synchronized clutch assembly 82 is substantially identical to the structure and function of prior art double-acting synchronized clutch assembly, examples of which may be seen by reference to U.S. Pat. Nos. 4,462,489; 4,125,179 and 2,667,955 the disclosures of all of which are hereby incorporated by reference. The synchronized clutch assembly 82 illustrated is of the pin-type described in above-mentioned U.S. Pat. No. 4,462,489.

The splitter jaw clutch 80 is a two-position clutch assembly which may be selectively positioned in the rightwardmost or leftwardmost positions for engaging either gear 76 or gear 74, respectively, to the mainshaft 46. Splitter jaw clutch 80 is axially positioned by means of a shift fork 84 controlled by a two-position piston actuator 86 which is operable by a driver selection switch such as a button or the like on the shift knob (not shown) as is known in the prior art. Two-position synchronized clutch assembly 82 is also a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90, the actuation and control of which will be described in greater detail below.

As may be seen by reference to FIGS. 1-2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three layer auxiliary section of the combined range and splitter type providing four selectable speeds or drive ratios between the input (mainshaft 46) and output (output shaft 58) thereof The mainsection 12 provides a reverse and three potentially selectable forward speeds. However, one of the selectable mainsection forward gear ratios, the low speed gear ratios associated with mainshaft gear 42, is not utilized in the high range. Thus, transmission 10 is properly designated as a "(2+1)×(2×2)" type transmission providing nine or ten selectable forward speeds, depending upon the desirability and practicality of splitting the low gear ratio.

While clutch 82, the range clutch, should be a synchronized clutch, double acting clutch collar 80, the splitter clutch, is not required to be synchronized. The shift pattern for shifting transmission 10 is schematically illustrated in FIG. 2. Divisions in the vertical direction at each gear lever position signify splitter shifts while movement in the horizontal direction from the three/four and five/six leg of the H pattern to the seven/eight and nine/ten leg of the H pattern signifies a shift from the low range to the high range of the transmission. As discussed above, splitter shifting is accomplished in the usual manner by means of a vehicle operator actuated splitter button or the like, usually a button located at the shift lever knob while operation of the range clutch shifting assembly is an automatic response to movement of the gear shift lever between the central and rightwardmost legs of the shift pattern as illustrated in FIG. 2 and will be described in greater detail below. Range shift devices of this general type are known in the prior art and may be seen by reference to above-mentioned U.S. Pat. Nos. 3,429,202; 4,455,883; 4,561,325 and 4,663,725.

Referring again to FIG. 2, and assuming that it is desirable that a transmission have generally equal ratio steps, the mainsection ratio steps should be generally equal, the splitter step should be generally equal to the square root of the mainsection ratio steps and the range step should equal about the mainsection ratio step raised to the N power where N equals the number of mainsection ratio steps occurring in both ranges (i.e., N=2 in the (2+1)×(2×2) transmission 10). Given the desired ideal ratios, gearing to approximate these ratios is selected. In the above example, the splitter steps are about 33.3% while the range step is about 316% which is generally suitable for a "2+1" main transmission section having about 78% steps as the square root of 1.78 equals about 1.33 and 1.78 raised to the second power (i.e. N equals 2) equals about 3.16.

Figure 4:
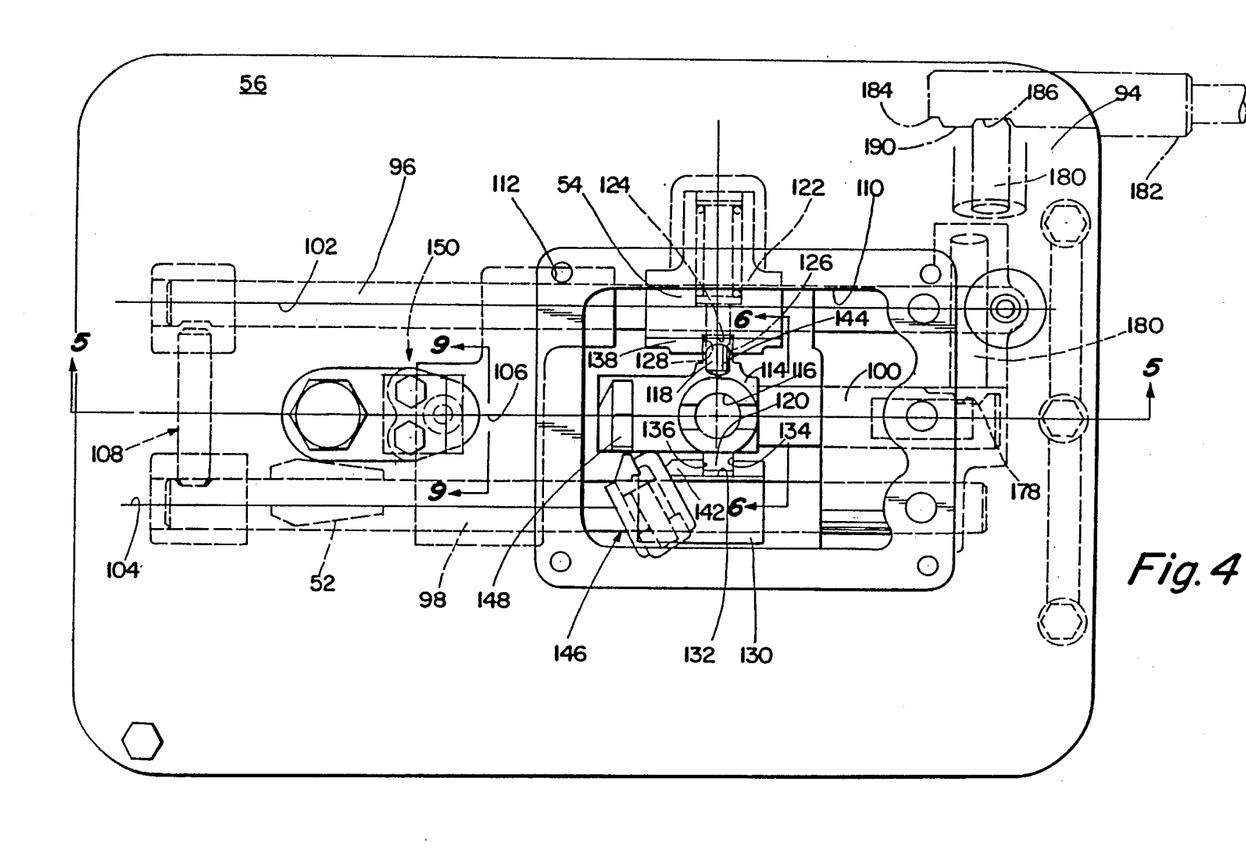
FIG. 4 is a top view of the shift bar housing assembly of the transmission of FIG. 1.
Figure 5:
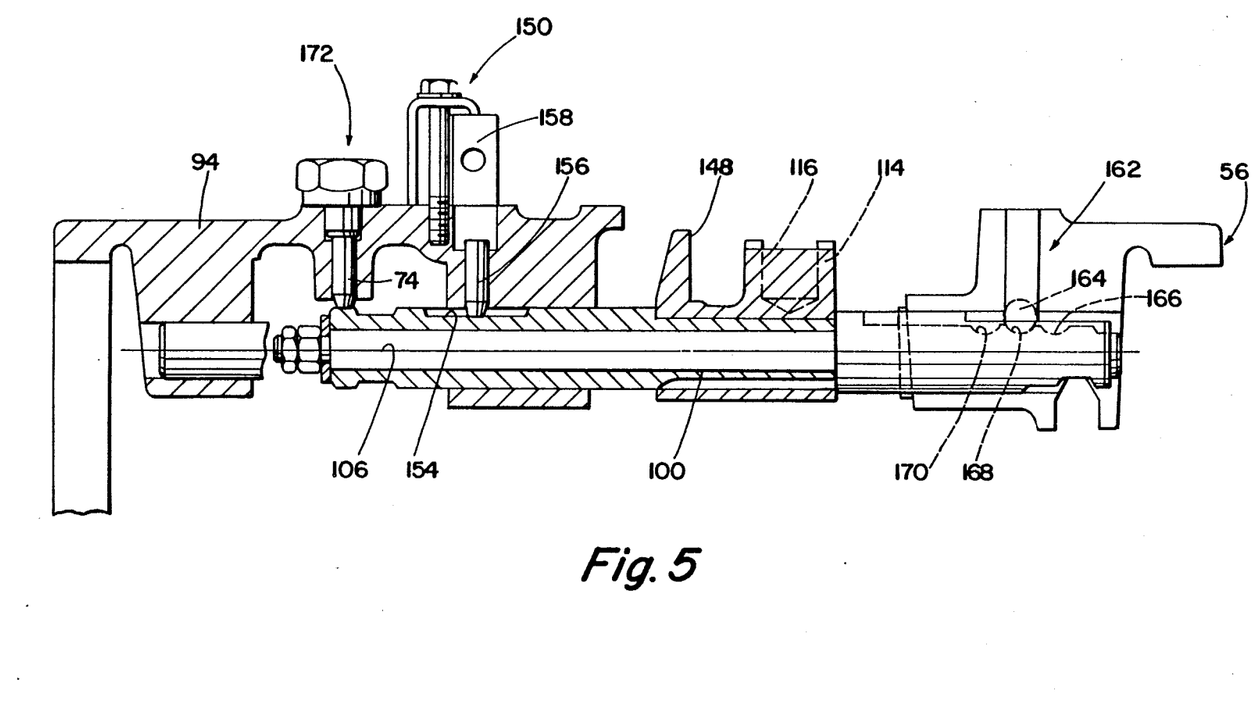
FIG. 5 is a elevational view taken along line 5—5 of FIG. 4.

Shift control unit or assembly for controlling shifting of the main transmission section 12 and the range portion, clutch 82, of the auxiliary section 14 of transmission 10 is defined by the shift bar housing assembly 56. Referring to FIGS. 3-5, shift bar housing assembly 56 includes a housing 94 which is mountable to the upper opening provided in transmission housing 16 and which may carry the range clutch actuating piston assembly 96 thereto Shift bar housing 94 supports a first shift bar (also called "shift bar" and/or "shift rail") 96 and a second shift bar 98 for independent axial movement therein. Shift bar 96 carries shift fork 54 for axial movement therewith and shift bar 98 carries shift fork 52 for axial movement therewith. Shift bar housing 94 also supports a control shaft 100 for axial and rotational movement therein. Shift rails 96 and 98 and control shaft 100 are axially movable about axes 102, 104 and 106, respectively, which are substantially parallel Alternatively to being axially rotatably movable in housing 94, shaft 100 may be fixed to the housing and support a sleeve 100A for axial and rotational movement thereabout as may be seen by reference to FIGS. 6-8.

The operation of shift bars 96, 98 is standard and consists of movement of shift bar 96 rightwardly and leftwardly, respectively, from the axially nondisplaced, neutral position indicated in FIG. 1 for engaging gears 40 and 20, respectively, to mainshaft 46 and movement of shift rod 98 rightwardly and leftwardly, respectively, for engagement of gears 44 and 42, respectively, to mainshaft 46. A standard interlock mechanism indicated generally at 108 is provided to prevent simultaneous movement of shift bars 96 and 98 from the neutral centered positions thereof to prevent engagement of more than one mainshaft gear at a time to the mainshaft 46. The shift bar housing 94 is provided with an opening 110 therein for receipt of a shift finger (not shown) carried by either a standard direct control shift lever or cross shaft of a remote control mechanism as is well known in the prior art. The housing 94 is provided with means such as tapped apertures 112 adjacent the opening 110 allowing mounting of a standard shift lever shift tower or remote control mechanism. Control shaft 100 carries a bushing member 114 fixed for rotational and axial movement therewith. Bushing 114 defines a generally upwardly facing socket 116 for receipt of the lower end of a shift finger to define a ball and socket type joint therewith. Accordingly, it may be seen that the shift bar housing assembly 56 is equally well suited for both direct and remote control type shifting of transmission 10.

Fixed for axial and rotational movement with control shaft 100 are a pair of shift tab elements 118 and 120 located generally diametrically opposite one another and here shown as integral with bushing member 114. Shift bar 96 carries fixed for axial movement therewith a block member 22 having a generally circumferentially extending slot 124 therein defined by opposed strike or engagement surfaces 126 and 128 for selective cooperation with the shifting tab member 118. As may be seen, a nondisplaced positions of control shaft 100 and shift bar 96, tab 118 will align with and be rotatable through groove 124. Similarly, shift bar 98 carries a shift block member 130 having a generally circumferentially extending groove 132 defined by two oppositely facing strike surfaces 134 and 136 for selective cooperation with the shift tab member 120.

Block member 122 defines a first axial groove 138 and a second axial groove 140 extending axially therethrough and interrupting both of the strike surfaces 126 and 128 defined thereby. Shift block member 130 defines an axially extending guide surface or groove 142 and interrupting both strike surfaces 134 and 136 defined thereby.

Referring to all of the Figures, and to FIGS. 6-8 in particular, the operation of shift bar housing assembly 56 will be described in greater detail. For selection of either reverse low, reverse high, first or second speed operation of transmission 10, the control shaft 100 is rotated to its most clockwise position as seen in FIG. 8. In this position, the bushing 116 will contact the shift block member 122 to limit further clockwise rotation as is known in the prior art. A spring biased plunger member 144 is provided to give the operator an indication of having selected the reverse and low speed rail position, the most leftward leg of the shift pattern as seen in FIG. 2, and to resiliently urge the transmission out of this position upon release by the operator. In the position shown in FIG. 8, the control shaft 100 may be moved axially rightwardly or leftwardly, respectively, causing the shift tab member 118 to engage strike surfaces 126 or 128, respectively, to cause engagement of gears 44 or 42, respectively, to the mainshaft 46 for reverse or low speed operation (first/second speeds), respectively, of transmission 10. Axial movement of the control shaft 100 and the shift bar 96 therewith will be guided by the opposite shift tab member 120 interaction with the guide surface 142 defined by the shift block member 130 carried by the other shift bar 98.

Figure 7:
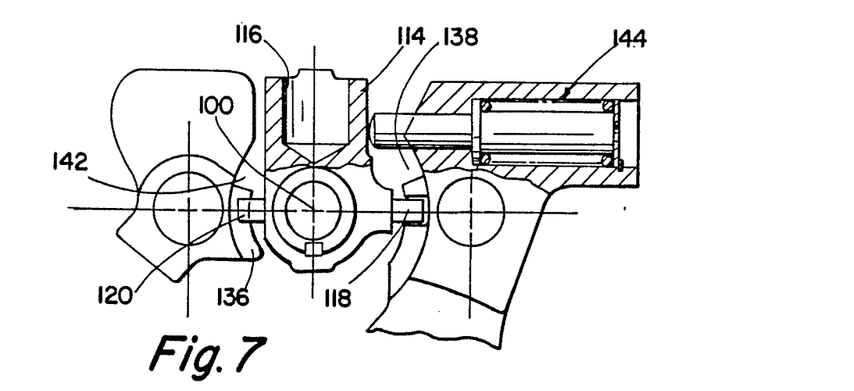
Figure 8:
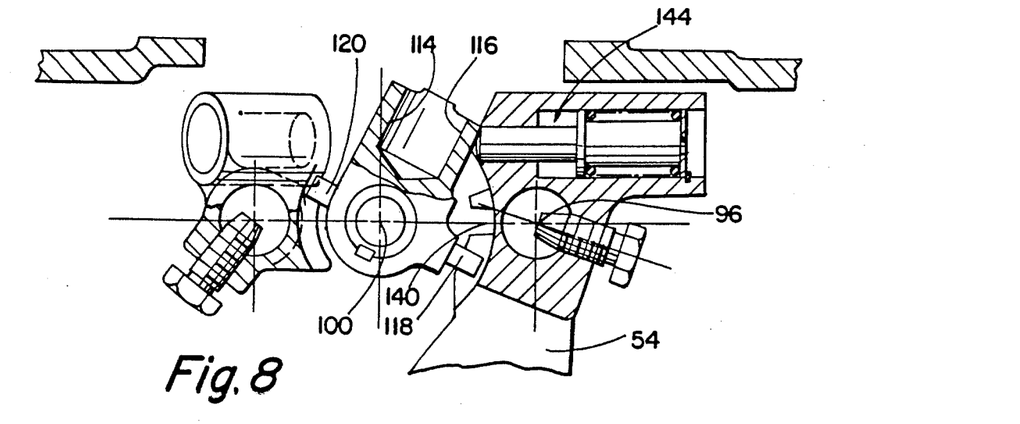

To select engagement of gears 40 or 20 to the mainshaft 46 for operation in the third, fourth, fifth or sixth speed positions of transmission 10, the bushing 114 and control shaft 100 fixed for rotation therewith is positioned as shown in FIG. 7. The spring biased plunger assembly 146 and a finger member 148 fixed for rotation with the bushing 114, preferably integral therewith, is provided to assist the operator by providing a verification field that he has properly selected the position shown in FIG. 7. Briefly, upon initial engagement of the plunger 146 by finger 148 the operator will be assured that the control shaft 100 is properly rotationally positioned for operation in the middle leg of the shift pattern illustrated in FIG. 2. Having positioned the control shaft 100 and bushing 114 as illustrated in FIG. 7, rightward and leftward axial movement, respectively, of the control shaft 100 will cause the shift tab 120 to engage strike surfaces 134 or 136, respectively, to engage either gear 40 or 20 to the mainshaft 46. It is noted, that in the position illustrated in FIG. 7 the opposite shift tab is 118 is aligned with guide groove 140 defined in the shift block 122 to maintain the rotational position of control shaft 100 during axial displacement thereof.

Figure 6:
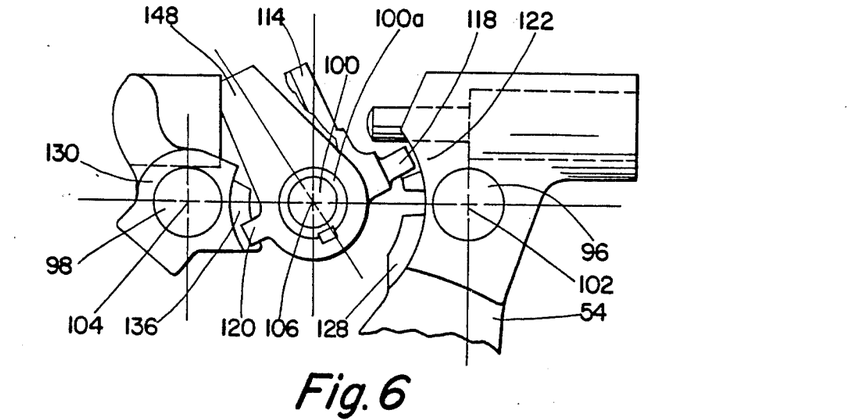
FIGS. 6, 7 and 8 are partial sectional views taken along line 6—6 in FIG. 4 showing selectable operational positions of the shift bar housing assembly.

To select high range operation of transmission 10, i.e., operation in the seventh, eighth, ninth or tenth speeds thereof, the control shaft 100 and bushing 114 are located in the counterclockwisemost position as illustrated in FIG. 6. In this position, finger 148 will completely depress the spring biased plunger 146 and will bottom-out thereon giving the operator a positive indication of correct rotational positioning of the control shaft 100. Shift tab member 120 will be engagable with either strike surface 134 or 136 whereby rightward and leftward axial movement of control shaft 100 will result in engagement of gears 40 and 20 with mainshaft 46 as is discussed above. It is noted that in the position illustrated in FIG. 6 the tab member 118 will be guided by the groove 130 defined in the shift block member 122 to maintain the control shaft 100 in the correct rotational position thereof during axial displacements from the centered position thereof.

Figure 9:
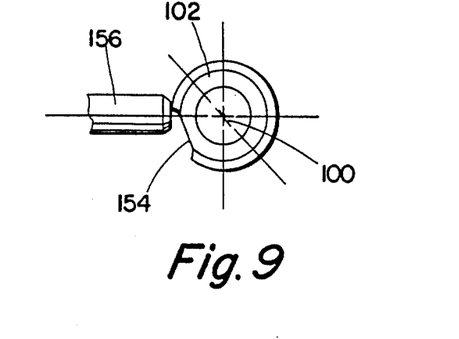
FIGS. 9 and 10 respectively, are partial sectional views taken along line 9—9 of FIG. 4 corresponding to the shift bar housing positions illustrated in FIGS. 6 and 7, respectively.
Figure 10:
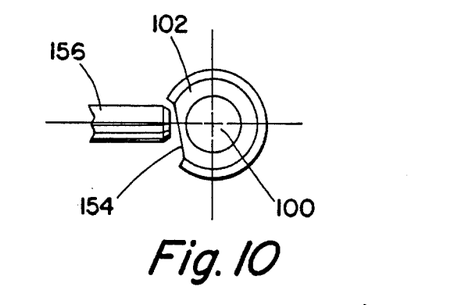

To accomplish a shifting of the range section of the transmission 10 to achieve high range operation thereof, synchronized clutch assembly must be shifted to the leftwardmost position thereof as illustrated in FIG. 1. To accomplish this without requiring the operator to actuate any control device other than the gear lever movements to the rightwardmost leg of the shift pattern as seen in FIG. 2, the range control valve assembly 150 is provided which will be described in greater detail below. Briefly, the range control assembly includes a slotted sleeve member 152 fixed for rotation with shaft 100 which sleeve is provided with a groove 154 extending along only a limited circumferential portion thereof as may be seen by reference to FIGS. 9 and 10. A spring biased plunger member 156 connected to a master control valve 158 is axially aligned with the grooved portion 154 of sleeve 152 for all axial positions of shaft 100. Briefly, as may be seen by reference to FIG. 9, when the control shaft 100 is rotated to the high range position corresponding to FIG. 6, the plunger 156 will be forced radially outwardly causing the master valve 158 to provide a signal to a slave valve 160 located at piston assembly 90 to shift the shift fork 88 leftwardly as is shown while positioning of the control shaft 100 the low range position corresponding with FIGS. 7 and 8 will cause the plunger 156 to extend further radially inwardly as shown in FIG. 10 causing the master valve 158 to signal the slave valve 160 to shift the shift fork rightwardly from the position shown in FIG. 1 to achieve a low range mode of operation.

The shift bar housing assembly 56 is also provided with a spring biased detent assembly 162 comprising a spring biased detent ball 164 biased inwardly to interact with grooves 166, 168 and 170 provided on the shift rails to maintain the transmission in the centered or axially displaced positions thereof and to provide a positive feel of having achieved a properly centered or displaced position. The shift bar housing assembly 56 is also provided with a neutral switch device 172 for sensing displacement of the control shaft 100 from the axially centered position thereof and for providing a neutral/not neutral control signal. Briefly, device 172 comprises a spring inwardly biased plunger 174 which will cooperate with ramps and grooves formed on the control shaft 100 to provide a signal indicative of axial displacement from the axially centered nondisplaced position of the control shaft 100.

Under most operating conditions, for proper operation of transmission 10, and specifically to prevent burn up of the synchronizing clutches utilized in the double acting range clutch assembly 82, it is important that a change in the auxiliary section range ratio not be initiated until the main transmission section is in neutral and that the main transmission section remain in neutral until the newly selected auxiliary section range ratio is fully engaged. A change in the range section ratio cannot occur unless there is a rotational movement of the control shaft 100 between the positions illustrated in FIGS. 6 and 7 which will not occur unless both of the shift bars 96 and 98 and the control shaft 100 are in the axially centered position as illustrated in FIG. 4 wherein the shift tab members 118 and 120 are axially aligned with the circumferentially extending grooves 124 and 132 defined by the shift block members 122 and 130. A not neutral signal from device 172 may also be used to prevent initiation of a range shift until the mainsection 12 is in neutral.

Figure 11:
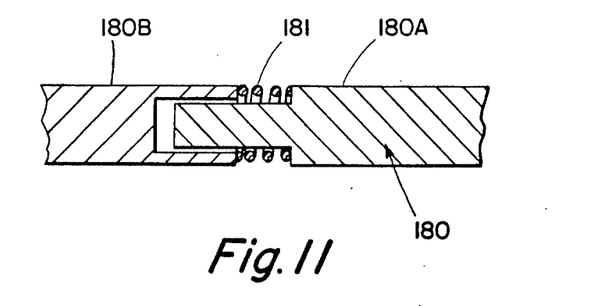
FIG. 11 is a partial sectional view of a typical spring biased plunger assembly for the resilient interlock of the present invention.

Accordingly, the shift bar housing 56 of the present invention, as in the case with prior art devices such as the device illustrated in above-mentioned U.S. Pat. No. 4,561,325, will not initiate a change from high range to low range or visa verse until such time as the main transmission section is brought to neutral. However, it is also important to inhibit, but not prohibit, re-engagement of the main transmission section until the range shift has been completed. To accomplish this the control shaft 100 is provided with a ramped groove 178 for cooperation with a resiliently axially compressible plunger member 180 which will be biased radially inwardly toward shaft 100 by means of a range interlock cross shaft 182 provided with grooves 184 and 186 which will align with the pin 180 when the range clutch is either in the rightwardmost or leftwardmost position thereof and is also provided with a land section 190 which will align with the pin 180 when the synchronized clutch assembly 82 is not fully engaged to bias the interlock pin 180 radially inwardly. To provide an inhibit rather than a prohibit type interlock mechanism to allow shifting of the main transmission in emergency situations, the interlock pin member 180 will be resiliently compressible as is seen in FIG. 11, allowing the operator to overcome the range interlock mechanism. Preferably, cross shaft 182 is integral with the piston member carrying shift fork 88 or is axially fixed thereto. Interlock pin member 180 may include a first portion 180A and a second portion 180B which are biased axially apart by a coil compression 181 in a known manner.

Preferably, the force required to overcome the resilient interlock, as experienced by the operator at the shift lever, will be significantly greater, preferably at least twice as great, as the force necessary to overcome low-reverse plunger 144, to provide a positive indication to the operator that a normally inhibited shift is being attempted.

Figure 12A:
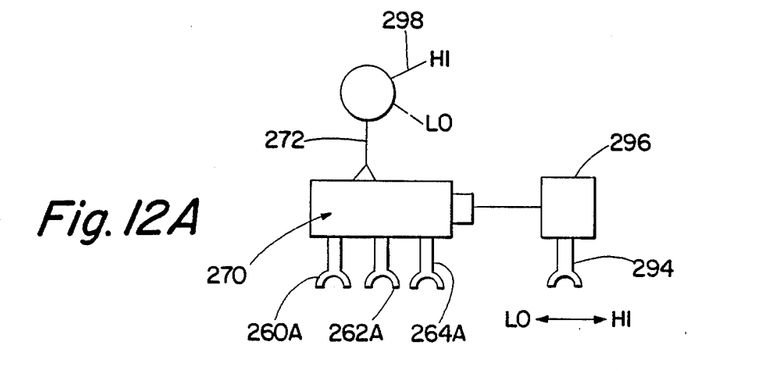
Figure 12B:
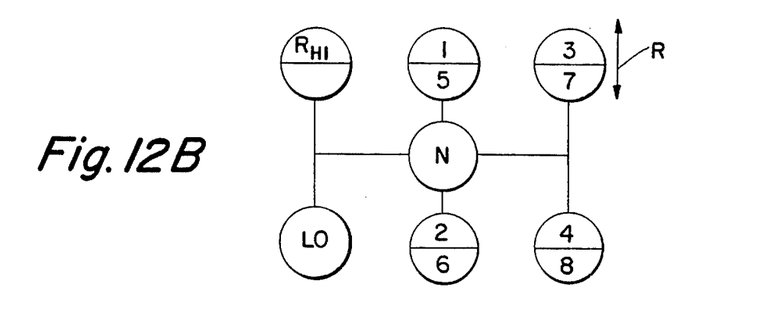

An alternate, more conventional, range type transmission which may utilize the resilient range interlock of the present invention may be seen by reference to FIGS. 12, 12A and 12B.

Referring to FIGS. 12, 12A and 12B, a range type compound transmission 210 with which the shifting mechanism of the present invention is advantageously utilized is illustrated. Compound transmission 210 comprises a multiple speed main transmission section 212 connected in series with a range type auxiliary section 14. Transmission 210 is housed within a housing H and includes an input shaft 216 driven by a prime mover such as diesel engine E through a selectively disengaged, normally engaged friction master clutch C having an input or driving portion 218 drivingly connected to the engine crankshaft 220 and a driven portion 222 rotatably fixed to the transmission input shaft 216.

In main transmission section 212, the input shaft 216 carries an input gear 224 for simultaneously driving a plurality of substantially identical countershaft assemblies 226 and 226A at substantially identical rotational speeds. The two substantially identical countershaft assemblies are provided on diametrically opposite sides of mainshaft 228 which is generally coaxially aligned with the input shaft 216. Each of the countershaft assemblies comprises a countershaft 230 supported by bearings 232 and 234 in housing H, only a portion of which is schematically illustrated. Each of the countershafts is provided with an identical grouping of countershaft gears 238, 240, 242, 244, 246 and 248, fixed for rotation therewith. A plurality of mainshaft gears 250, 252, 254, 256 and 258 surround the mainshaft 228 and are selectively clutchable, one at a time, to the mainshaft 228 for rotation therewith by sliding clutch collars 260, 262 and 264 as is well known in the prior art. Clutch collar 260 may also be utilized to clutch input gear 224 to mainshaft 228 to provide a direct drive relationship between input shaft 216 and mainshaft 228.

Typically, clutch collars 260, 262 and 264 are axially positioned by means of shift forks 260A, 262A and 264A, respectively, associated with the shift housing assembly 270, as well known in the prior art, see U.S. Pat. Nos. 4,502,346 and 4,543,843, the disclosures of which are incorporated by reference. Clutch collars 260, 262 and 264 may be of the well known acting synchronized or nonsynchronized double acting jaw clutch type.

Mainshaft gear 258 is the reverse gear and is in continuous meshing engagement with countershaft gears 248 by means of conventional intermediate idler gears (not shown). It should also be noted that while main transmission section 212 does provide five selectable forward speed ratios, the lowest forward speed ratio, namely that provided by drivingly connecting mainshaft drive gear 256 to mainshaft 228, is often of such a high gear reduction it has to be considered a low or "creeper" gear which is utilized only for starting of a vehicle under severe conditions and, is not usually utilized in the high transmission range. Accordingly, while main transmission section 212 does provide five forward speeds, it is usually referred to as a "four plus one" main section as only four of the forward speeds are compounded by the auxiliary range transmission section 214 utilized therewith.

Jaw clutches 260, 262, and 264 are three-position clutches in that they may be positioned in the centered, nonengaged position as illustrated, or in a fully rightwardly engaged or fully leftwardly engaged position by means of a shift lever 272. As is well known, only one of the clutches 260, 262 and 264 is engagable at a given time and main section interlock means are provided to lock the other clutches in the neutral condition.

Auxiliary transmission range section 214 includes two substantially identical auxiliary countershaft assemblies 274 and 274A, each comprising an auxiliary countershaft 276 supported by bearings 278 and 280 in housing H and carrying two auxiliary section countershaft gears 282 and 284 for rotation therewith. Auxiliary countershaft gears 282 are constantly meshed with and support range/output gear 286 while auxiliary section countershaft gears 284 are constantly meshed with output gear 288 which is fixed to transmission output shaft 290.

A two-position synchronized jaw clutch assembly 292, which is axially positioned by means of shift fork 294 and the range section shifting actuator assembly 296, is provided for clutching either gear 286 to mainshaft 228 for low range operation or gear 288 to mainshaft 228 for direct or high range operation of the compound transmission 210. The shift pattern for compound range type transmission 210 is schematically illustrated in FIG. 12B. Selection of low or high range operation of the transmission 210 is by means of an operator actuated switch or button 298 which is usually located at the shift lever 272. Alternatively a "double H" type auxiliary shifting device may be utilized.

The shift bar housing of transmission 212 is preferably provided with an interlock, which may comprise an interlock similar to interlock 108 illustrated in FIG. 1, actuated by a resiliently compressible interlock plunger, see above-mentioned U.S. Pat. No. 4,676,115, to provide the resilient range interlock function.

Although the preferred embodiments of the present invention have been described with a certain degree of particularity, such descriptions are by way of example only and various modification and rearrangement of the parts is possible without departing from the spirit and the scope of the invention as hereinafter claimed.

We claim:

1. A range type compound change gear transmission (10/210) comprising a multiple speed ratio main transmission section (12/212) connected in series with a multiple speed ratio range type auxiliary transmission section (14/214) and a shift control assembly (56/270) therefor, said control assembly comprising a shift bar housing assembly (56) including at least two parallel shift rods (96, 98) axially movable therein from axially nondisplaced to axially displaced positions to engage and disengage, one at a time, selected main transmission section ratios, means (148/270) to selectively axially move the shift rods, and means (150/298) effective only when said main transmission is in neutral for causing the shifting of said range type auxiliary transmission section, said transmission characterized by:

a range interlock assembly (178, 190) having a first position when one of said range auxiliary section speed ratios is engaged and a second position when said range auxiliary section is in a shift transient, said range interlock assembly in said second position resiliently inhibiting axial displacement of said main transmission section shift rods from the axially centered positions thereof.

2. The transmission of claim 1 wherein said interlock assembly includes a plunger member (180) resiliently urged into engagement with a notched shaft (178, 100) in said shift bar housing in the second position of said interlock assembly 3. The transmission of claim 2 wherein said interlock plunger member is resiliently axially compressible (FIG. 11).

4. The compound transmission of claim 3 wherein said transmission includes a selectable reverse ratio and resilient plunger means (144) are provided to inhibit selection of said reverse ratio, the force required to axially displace said main transmission section shift rods from the centered positions thereof when said range section interlock assembly is in the second position thereof being significantly greater than the force required to select said reverse ratio in opposition to said resilient plunger means.

5. The compound transmission of claim 4 wherein said range section comprises a two-position synchronized clutch assembly.

6. The compound transmission of claim 3 wherein said range section comprises a two-position synchronized clutch assembly.

7. The compound transmission of claim 2 wherein said range section comprises a two-position synchronized clutch assembly.

8. The compound transmission of claim 1 wherein said transmission includes a selectable reverse ratio and resilient plunger means (144) are provided to inhibit selection of said reverse ratio, the force required to axially displace said main transmission section shift rods from the centered positions thereof when said range section interlock assembly is in the second position thereof being significantly greater than the force required to select said reverse ratio in opposition to said resilient plunger means.

9. The compound transmission of claim 8 wherein said range section comprises a two-position synchronized clutch assembly.

* * * * *